UNITED STATES PATENT OFFICE.

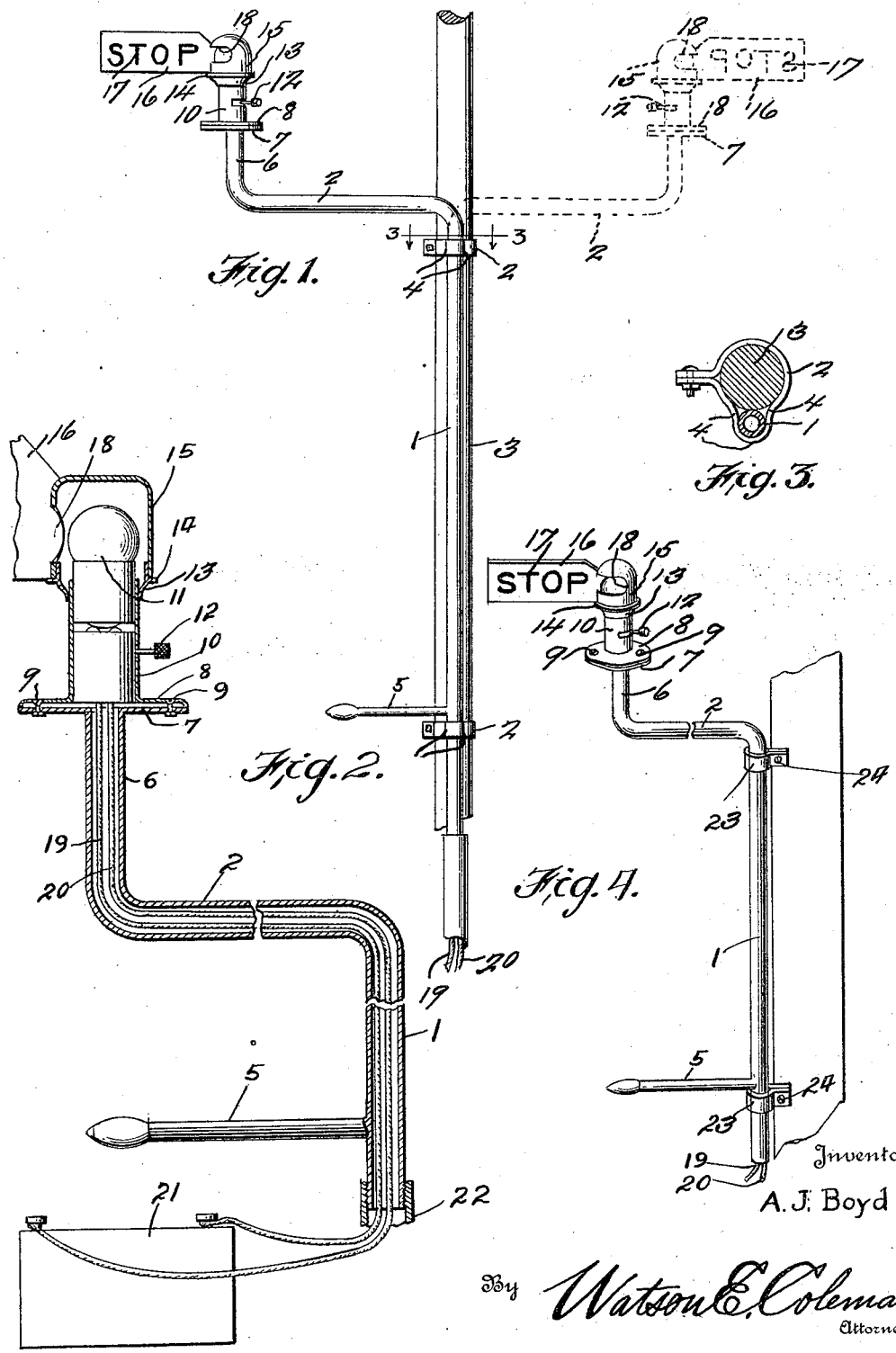

ANGUS J. BOYD, OF DEDHAM, MASSACHUSETTS.

STOP SIGNAL FOR AUTOMOBILES.

1,412,160.  Specification of Letters Patent.  Patented Apr. 11, 1922.

Application filed July 6, 1921. Serial No. 482,651.

*To all whom it may concern:*

Be it known that I, ANGUS J. BOYD, subject of the King of England, residing at Dedham, in the county of Norfolk and State of Massachusetts, have invented certain new and useful Improvements in Stop Signals for Automobiles, of which the following is a specification, reference being had to the accompanying drawings.

It is the purpose of the present invention to provide a device of this general character particularly adapted for use on automobiles, trucks and the like for indicating to the chauffeur of the automobile in the rear, that the forward automobile will stop.

Another purpose is to provide a signal of this kind consisting of rocking tubular rods, mounted on the side of the automobile or truck, and provided with a right angle extension having a stop signal, whereby when the rod is rocked, the right angle extension will be extended laterally from the side of the automobile, so as to indicate that the forward automobile will stop, or turn, as the signal is to be used when making all turns.

Still another purpose is the provision of illuminating means, for lighting up the stop signal at night, so that it may be readily read by the chauffeur in the automobile at the rear.

A further purpose is the provision of means for mounting the stop signal on the casing of the illuminating means.

A still further purpose is to employ the tubular rocking rod for housing electrical connections between the illuminating means and a battery, whereby the connections may be protected.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in elevation of the improved stop signal including the rocking rod, as being mounted in strap bearings carried by an upright rod of the automobile, or by one of the stays, which support the top.

Figure 2 is a vertical sectional view through the tubular rocking rod, showing the illuminating means and the electrical connections.

Figure 3 is a cross sectional view on line 3—3 of Figure 1, showing how the rocking rod is mounted in its bearings.

Figure 4 is a perspective view of the stop signal, showing a modified construction of clamps for mounting the rocking rod on the wooden part of a truck.

Referring to the drawings, 1 designates the tubular rod, which may be mounted in suitable bearings, so that its right angle portion 2 may be moved to extend laterally from the automobile. The bearings for the rocking rod, as in Figures 1 and 3 each comprises a metallic strap 2, which engages about the supporting rod 3, which may constitute any suitable part of the automobile, for the purpose of supporting the stop signal. Each strap may be large enough to fit any size of rod 3, and is bent at 4 to provide an offset bearing, which overlies the tubular rocking rod. It will be noted that one of the strap bearings is disposed in a position under a handle 5 of the rocking rod 1, to prevent the rod 1 from displacement downwardly, that is from gradually moving downwardly, due to the constant rotating of the rod for signalling purposes. The handle 5 extends at right angles to the tubular rod 1, and lies in a plane parallel with and below the right angle extension 2.

The extension 2 terminates in an upstanding arm 6 terminating in a plate 7, to which a correspondingly shaped plate 8 is bolted or otherwise secured by means of the bolts 9. A suitable casing 10 is carried by the plate 8, and mounted in and supported by the casing 10 is a conventional form of electric light lamp 11. A suitable switch lever or arm 12 is operatively connected to the base of the lamp in the usual manner, for closing and opening the circuit, for the purpose of operating the lamp.

A band 13 is mounted permanently in any suitable manner upon the casing 10, and has an annular flange 14, to limit the downward movement of the housing 15, which telescopically fits the band 13. A suitable plate 16 is fastened to the housing by soldering, brazing or by any suitable means, and has applied thereto or painted thereon the word "Stop" 17. A portion of the wall of the housing 15 is cut away to provide an opening 18, which permits the rays from the lamp to reflect upon the face of the plate which carries the stop signal. The housing 15 frictionally fits the band 13 so as to be retained securely in position. Suitable leads or wires 19 and 20 pass through the tubular rocking rod 1 and are connected in any suitable manner to the lamp. These wires or leads are in turn connected to a conventional form of battery 21, for supplying current to the lamp. The leads or wires may be protected from a position adjacent the battery 21 to the lamp, by means of a plurality of tubes 22 through which the wires or leads may pass. A portion of one of these tubes is illustrated in Figure 2 as being threaded to the tubular rocking rod 1, and owing to the threaded connections, the tubular rocking rod is capable of a half or quarter turn so as to move the extension 2 laterally from the automobile, and then return it within or to the side of the automobile. The sections of tubes 22 which are to be used to house the wires or leads below the rocking rod may be secured fixedly to any suitable part of the automobile, so as to hold the tubes secured against movement, so that when the tubular rocking rod is oscillated, the threaded connections will remain relatively the same.

In the use of the device, the tubular rocking rod 1 is arranged so that its extension arm 2 will lie normally within the car body, or adjacent the side of the body, so that the stop signal cannot be seen. However when the chauffeur desires to indicate to the chauffeur to the rear, or to signal the traffic policeman that it is the intention to stop or turn the automobile, the handle 5 may be grasped, and the tubular rod 1 rocked, which will move the extension 2 laterally from the automobile, thereby displaying the stop signal.

In Figure 4 strap bearings 23 are shown as being fastened by screws 24 to the wooden part of a truck or the like, in order to support the tubular rod 1.

The invention having been set forth, what is claimed as being new and useful is:—

1. In an automobile signal, a rod to be mounted in bearings of an upright portion of the automobile for rocking movements, means to prevent downward axial movement thereto, said rod terminating at its upper end in a lateral portion having an upstanding part, the terminal of which being provided with a circular plate, a housing for electrical connections to a bulb detachably mounted upon said plate and movable axially with the upstanding portion, a bulb housing mounted on the first housing, and provided with a signal plate on the second housing extending laterally in a plane parallel with the lateral part of said rod, and provided with directions thereon, said bulb housing having an opening, through which the light rays from the bulb illuminates the directions on the signal, said rod being tubular, for the reception of conductors which operatively connect with the electrical connections for the bulb.

2. In an automobile signal, a rod mounted for rocking movements in bearings of a perpendicular portion of an automobile, said rod terminating at its upper end, a lateral offset part in a plane parallel with the body of said part, said offset part having at its upper end a circular plate, a housing for electrical connections to a bulb, detachably supported on said plate, a bulb housing mounted on the first housing, a lateral signal on the bulb housing and having directions thereon, said bulb housing having an opening, through which the light rays from the bulb illuminates the directions on the signal.

In testimony whereof I hereunto affix my signature.

ANGUS J. BOYD.